J. G. ZOLLEIS.
VALVE HANDLE.
APPLICATION FILED JAN. 19, 1921.
1,373,476.
Patented Apr. 5, 1921.
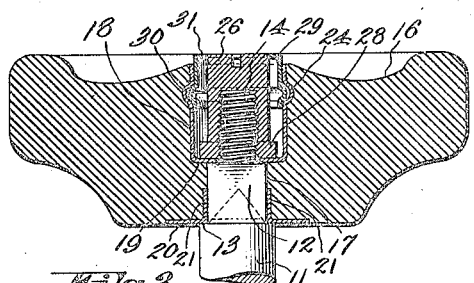
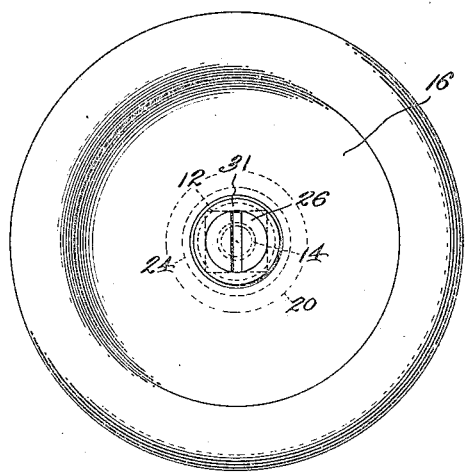
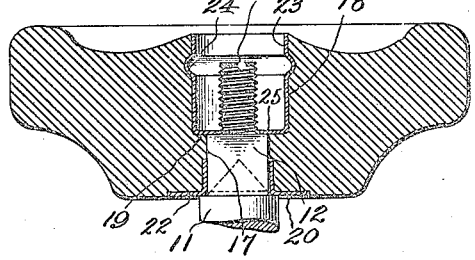
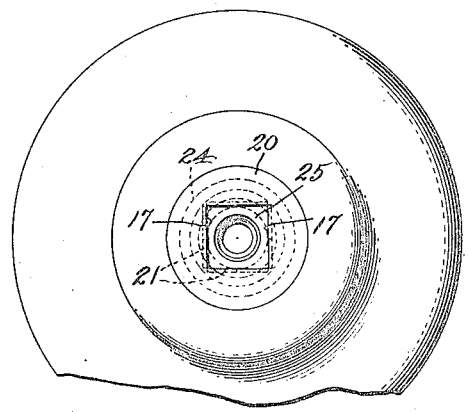
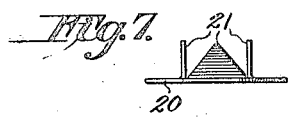
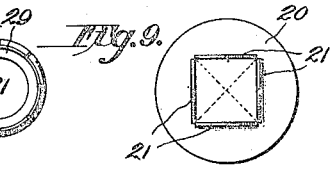
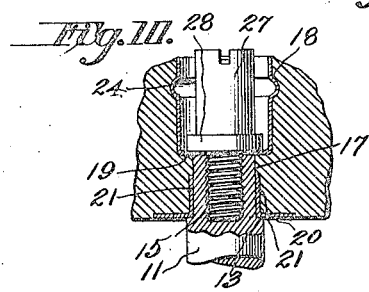
Inventor
John G. Zolleis
By his Attorneys
Meyers, Cavanagh & Hyde

UNITED STATES PATENT OFFICE.

JOHN G. ZOLLEIS, OF NEWARK, NEW JERSEY.

VALVE-HANDLE.

1,373,476.　　　　　Specification of Letters Patent.　　Patented Apr. 5, 1921.

Application filed January 19, 1921. Serial No. 438,309.

*To all whom it may concern:*

Be it known that I, JOHN G. ZOLLEIS, a citizen of the United States, and resident of Newark, in the county of Essex and State of New Jersey, have invented certain new and useful Improvements in Valve-Handles, of which the following is a specification.

My invention relates to a valve handle and more particularly to a non heat conducting handle adapted to be mounted on standard valve stems such as radiator valve stems or the like and has special reference to the provision of a handle of this type which shall combine the qualities of cheapness of manufacture, simplicity and therefor reduction in the cost of handling, facility of attachment and replacement, strength and durability of use.

Valve handles of the type referred to are usually made of a non heat conducting material, such as enameled wood, means being provided, attachable to the handle for connecting the handle to the metallic stem of a radiator valve. Standard valve stems are provided with a shank having an angular cross section, such, for example, as a squared cross section, the squared shank being adapted to receive a similarly contoured metallic element forming part of the handle, these parts coöperating to prevent relative rotation of handle and stem, the stem being further provided with a standard threaded element adapted for the reception of a securing means, such as a bolt, to secure the handle onto the stem against axial movement with respect to the said stem.

It has been found that the life of these valve handles is comparatively short, one of the common defects being the breaking of the handles in use and the splitting off of such handles from the valve spindles or stems to which they are attached. Various types of handles or wheels have been designed with a view to eliminating this defect but without substantial success. To overcome splitting some of the prior handles have been recessed either axially or radially of the wheel or both, cast metal being inserted in the recesses to provide for the strengthening thereof. It has been found, however, that such wheels are still subject to liability of breakage, the weakening of the wooden handles and the expansion of the metal due to heat conducted thereto from the radiator valve being the probable factors in causing such breakages. My invention contemplates the provision of a valve handle having in view the strengthening of the handle proper and the elimination of liability of breakage thereof.

Another common defect in handles of the type now in use lies in the separability of the parts making up the valve handle. The handle proper, the metal element received by the shank of the valve stem and the securing bolt are separate elements which require separate stocking and handling, such separate handling resulting in an unnecessary increment added to the ultimate cost. Furthermore, in assembling such handles on the valve stems in quantity and even in units for replacement purposes, each part of the handle must be individually fitted to make up the assembly, this consuming in the aggregate considerable time. Moreover, the handles are oft-times loosened during use, the bolt lost, the consuming of time being necessary to obtain a new bolt to fit the handle for repair purposes. My invention therefore further contemplates the provision of a handle in which the defects enumerated will be eliminated, the parts of the handle, although made separately, being assembled at the time of manufacture, thus eliminating the need of assembly at the time of use, the parts of the handle being, furthermore, attachable as a unit on the stem or spindle. the parts being so assembled as to eliminate accidental loss of any of the parts during use, such parts being furthermore so constructed and arranged that they may be easily disassembled in case one of the parts only requires replacement.

The principal objects of my invention therefore involve, in addition to the provision of a valve wheel or handle constructed and designed to reduce liability of breakage and to increase the strength and durability thereof, the provision of such a handle made of non heat conducting moldable material which will resist tendency of breakage and into which are molded metallic parts adapted for coaction with the valve stem; the provision of such a handle in which the parts are assembled to be handled as a unit from the time of manufacture to and including the time of its attachment to a valve stem and the further provision of such a handle in which the parts are made detachable and may be disassembled in the event of necessity of replacing only one of the parts.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention and in which Figure 1 is a cross sectional view of one form of my improved valve wheel showing its attachment to a valve stem supplied with external standard thread, Fig. 2 is a top plan view thereof, Fig. 3 is a cross sectional view of the same with parts removed, Fig. 4 is a bottom plan view of the same, Figs. 5 to 9 are detail views of parts of the wheel, and Fig. 10 is a cross sectional view of a modified form of the wheel, parts being broken away, and showing its attachment to a valve stem provided with internal standard thread.

Referring to the drawings, the two types of standard valve stems now in use comprise generally a post 11, provided with a shank 12 formed integrally therewith and having an angular cross section such as, for example, a squared cross section, the post being of a diameter somewhat larger than the diameter of the shank to provide for shoulders 13 to form an abutting means to limit the downward movement of the handle on the valve stem, as described hereinafter. Standard valve stems are of two forms, one of these forms being shown in Fig. 1 of the drawings and comprises an externally threaded element 14 forming part of the valve stem, another of these forms being shown in Fig. 10 of the drawings and comprising an internally threaded element 15 also forming part of the valve stem. The squared shank 12 is adapted for the reception of the handle proper, the squared contour being provided for the purpose of preventing any relative rotation of the handle with respect to the valve stem, the threaded element 14 or 15 being adapted for the reception of a nut or bolt in order to secure the handle on the valve stem.

For the purpose of securing a durable handle and in order to minimize the liability of splitting thereof, I preferably make the handle proper of a non heat conducting, moldable material into which are molded metallic parts adapted for resisting wear and for coacting with other parts of the handle and the valve stem. To this end I prefer to make the body of the handle 16 of molded material such, for example, as hard rubber, bakelite, or any other composition material capable of obtaining a high polish and capable of retaining such polish to present a finished appearance, not marred by use and distinguishable from the enameled wood now in use, which not only splits, but the enamel of which is oft-times seared or burned by the heat conducted from the valve, with the consequent deterioration of the handle as a whole. I have found that molded material, when used for a valve handle of the type herein disclosed, not only retains a finished appearance in use but presents a strong and durable handle not subject to liability of breaking and splitting. Although I prefer to make the body of the handle of molded material, I do not intend to limit myself to such material, as it will be obvious that in connection with the features described hereinafter, the body of the handle may be made of wood or other material. The handle 16 is provided with a bore 17 which may be of an angular cross section similar to the cross section of the shank 12, the shank being thus adapted to receive the handle by registering the squared bore of the handle with the squared shank of the valve stem. The handle is also provided with another bore 18 in alinement with the bore 17, such bore 18 being preferably of a larger diameter than the bore 17 to provide for shoulders 19 at the meeting plane of the lateral walls of the said bores, the said bore 18, furthermore, defining a cavity for the reception of elements to be described hereinafter.

For the purpose of providing means in the molded handle for resisting wear and for forming means of attachment to other elements, I preferably provide metallic inserts permanently molded into the handle and forming part thereof. To this end I provide a metallic insert 20, made of stamped material and stamped out of a disk, as clearly disclosed in Figs. 7 and 9 of the drawings, angular portions 21 being provided in said stamped insert, the said angular portions being molded into the material of handle 16 and forming part of the walls of the bore 17, the said insert being also provided with a flanged disk portion 22 molded into the bottom surface of the handle 16, this insert being adapted to rest on the shoulder 13 of the valve stem to limit the downward motion of the handle on the said stem. This insert is intended for the taking up of strains and stresses and consequent wear at the point of connection between the handle 16 and the squared shank 12 and shoulder 13 of the valve stem. I preferably provide a second metallic insert 23 which may be formed out of stamped material and which is permanently molded about the walls of the bore 18, the said insert 23 being provided with a recess or bead 24 for a purpose hereinafter to be described, in addition to the purpose of forming a means imbedded in the handle 16 to prevent removal of the insert 23 from out of the said handle 16. The insert 23 may also be provided with a flange portion 25 adapted to fit the shoulder 19, the said flange portion 25 being intended to take up strain and wear at this point. The molded handle and the permanently molded inserts form a unitary molded piece, as is shown, for example, in Fig. 3 of the drawings, this figure showing the attachment of this piece to a valve stem.

For the purpose of securing or attaching the handle to a valve stem, I provide a nut 26, shown in Fig. 1, or a bolt 27, shown in Fig. 10, having a preferably elongated threaded portion adapted for coaction with either the threaded element 14 or the threaded element 15, the said nut or bolt being provided with a flange portion 28 adapted to seat on the flange 25 or on the shoulder 19 in the event that the insert 18 is not provided with a flange, the flange 28 of the nut or bolt also serving the purpose of coacting with other elements to be hereinafter described to prevent removal of the nut or bolt from the cavity 18 in which it is housed.

For the purpose of obtaining a valve wheel which may be handled as a unit and attachable as a unit, means is provided for retaining the nut or bolt against displacement from the housing defined by the cavity or bore 18. Such retaining means may comprise, for example, a flanged cap 29, shown in detail in Figs. 6 and 8 of the drawings, said flanged cap being provided with a rib 30 adapted for insertion in the bead 24, the walls of the said cap 29 being slitted as shown, for example, in Fig. 6 of the drawings in order to provide a resiliency in the said cap to permit the snapping of the cap into the walls of the insert 18 and the coaction between the rib 30 and bead 24. The cap 29 is provided with a flange 31 having an internal diameter preferably fitting the diameter of the bolt 26 or nut 27, the flange 31 serving the purpose in connection with the flange 28 of the bolt or nut for the preventing of removal or displacement of the bolt or nut out of the cavity in which it is housed. These parts, however, are so constructed that in the event that any one part is desired to be removed, such, for example, as the nut or bolt 26, the parts may be disassembled, the nut being removable by unscrewing from the threaded element of the valve stem, it being then only necessary to secure a purchase upon the top part of the nut with the fingers and with a quick upward stroke to snap the nut out of position and out of the cavity in which it is housed.

The operation, the manner of assembly and use of my improved valve wheel or handle will be obvious from the above. The wheel proper 16 and the inserts 20 and 23 are molded as a unit, nut 26 or bolt 27 being then inserted into the cavity defined by the bore 18, the flanged cap 31 being then inserted and snapped into position. This assembly takes place at the time of manufacture and the valve wheel or handle is transported, stocked and handled as an assembled unit. In attaching the handle to a valve stem, all that is necessary is the inserting of the handle on the stem by the registration of the shank with the squared bore, such insertion resulting in the upward movement of the nut or bolt partially out of its cavity, which nut or bolt may be then grasped by the fingers and turned for the purpose of alining the threads, the nut or bolt being then screwed down tightly, as is obvious, the flange of the nut or bolt seating on the shoulder 19 or on the flange 25 to secure a tight fit or connection between the handle and the valve stem. In use, if the nut or bolt is loosened, the intercoaction of the flanges 31 and 28 will prevent the accidental loss of the nut, it being only necessary for purposes of repair to turn the nut for the tight connection desirable. In the event that only one of the parts, such as the handle proper, or nut or bolt requires replacement, the parts may be detached or disassembled, it being only necessary to unscrew the bolt or nut and to move the same outwardly by snapping the flanged cap 29 out of position.

It will thus be apparent that I have provided a valve wheel or handle which will be strong and efficient in use and in which the parts are assembled as a unit, permitting facility of handling, attachment and replacement, such parts being, furthermore, capable of detachment in case one of the parts only requires replacement.

While I have shown my device in the preferred form, it will be obvious that many changes and modifications may be made in the structure disclosed without departing from the spirit of the invention, defined in the following claims.

I claim:

1. A handle adapted for a standard valve stem having a shank of angular cross section and a threaded element for receiving the handle, said handle comprising a body portion provided with a bore, the walls of which are adapted to fit the valve stem shank and provided with a cavity in alinement with said bore, a securing means in said cavity and adapted for coaction with the threaded element of the stem and means for retaining said securing means against displacement from the cavity.

2. A handle adapted for a standard valve stem having a shank of angular cross section and a threaded element for receiving the handle, said handle comprising a body portion provided with a bore, the walls of which are adapted to fit the valve stem shank and provided with an enlarged cavity in alinement with said bore, the walls of the bore and the cavity defining shoulders in the meeting plane thereof, a securing means in said cavity and adapted for coaction with the threaded element of the stem, said securing means being provided with a flange portion adapted to engage the said shoulders and means for retaining said securing means against displacement from the cavity.

3. A handle adapted for a standard valve stem having a shank of angular cross section and a threaded element for receiving the handle, said handle comprising a body portion provided with a bore, the walls of which are adapted to fit the valve stem shank and provided with an enlarged cavity in alinement with said bore, the walls of the bore and the cavity defining shoulders in the meeting plane thereof, a securing means in said cavity and adapted for coaction with the threaded element of the stem, said securing means being provided with a flange portion adapted to engage the said shoulders and means for retaining said securing means against displacement from the cavity, the said retaining means including a flanged member mounted in said handle body portion and adapted to engage the flange portion of the securing means for retaining the same against displacement from the cavity.

4. A handle adapted for a standard stem comprising a body portion having alined central bores, the walls of one of the bores having an angular cross section adapted to fit an angular portion of the stem, a wear resisting insert being provided in said bore, another of said bores defining a cavity, a securing means housed by the walls of said cavity, said securing means adapted for coaction with a threaded portion of the stem and adapted to retain the handle on the stem and means affixed to said handle for retaining said securing means against displacement from the cavity.

5. A handle adapted for a standard stem comprising a body portion having alined central bores, the walls of one of the bores having an angular cross section adapted to fit an angular portion of the stem, a wear resisting insert being provided in said bore, another of said bores defining a cavity, a securing means housed by the walls of said cavity, said securing means adapted for coaction with a threaded portion of the stem and adapted to retain the handle on the stem and means affixed to said handle for retaining said securing means against displacement from the cavity, said retaining means comprising an insert affixed to the walls of said cavity and a member removably secured to the said insert.

6. The combination recited in claim 5, in which the securing means is provided with a flange adapted to retain the handle on the stem and in which the member comprises a resilient flanged element adapted to be removably snapped into the second mentioned insert and the flange of which coacts with the flange of the securing means to prevent its displacement from the cavity.

7. The combination recited in claim 6, in which the flange of the removable member is annular and is so contoured as to fit the contour of the securing means, the coaction of these parts adapted to resist radial strains on the handle.

8. A handle adapted for a valve stem or the like comprising a non heat conducting body made of molded material, said body being provided with a bore adapted to receive a valve stem and a metallic insert molded into the handle body and positioned about the walls of said bore.

9. A handle adapted for a valve stem or the like comprising a non heat conducting body made of molded material, said body being provided with alined bores adapted to receive a valve stem and metallic inserts molded into the handle body and positioned about the walls of said bores.

10. A handle adapted for a valve stem or the like comprising a non heat conducting body made of molded material, said body being provided with alined bores adapted to receive a valve stem, the walls of one of said bores being angular in cross section and metallic inserts molded into the handle body, one of said inserts having angular portions molded in the walls of the angular bore and in the bottom surface of the handle.

11. A handle adapted for a valve stem or the like comprising a non heat conducting body made of molded material, said body being provided with alined bores adapted to receive a valve stem, the walls of one of said bores being angular in cross section and metallic inserts molded into the handle body, one of said inserts having angular portions molded in the walls of the angular bore and in the bottom surface of the handle, the other of said inserts comprising a member lining the walls of the other bore and having a recess adapted to receive a retaining member.

12. A handle adapted for a valve stem or the like comprising a non heat conducting body made of molded material, said body being provided with alined bores adapted to receive a valve stem, the walls of one of said bores being angular in cross section and metallic inserts molded into the handle body, one of said inserts having angular portions molded in the walls of the angular bore and in the bottom surface of the handle, the other of said inserts comprising a member lining the walls of the other bore and having a recess adapted to receive a retaining member, a securing means in the other of said bores and a retaining member comprising a flanged cap removably held by the said recessed insert.

Signed at New York in the county of New York and State of New York this 17th day of January, A. D. 1921.

JOHN G. ZOLLEIS.